United States Patent
Conell et al.

(10) Patent No.: US 10,395,442 B2
(45) Date of Patent: Aug. 27, 2019

(54) SYSTEM AND METHOD FOR PERFORMING DIAGNOSTICS ON A DC-DC CONVERTER

(71) Applicant: GM Global Technology Operations LLC, Detroit, MI (US)

(72) Inventors: Jonathan O. Conell, Sterling Heights, MI (US); Robert A. De Stefano, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 134 days.

(21) Appl. No.: 15/668,108

(22) Filed: Aug. 3, 2017

(65) Prior Publication Data
US 2019/0043276 A1   Feb. 7, 2019

(51) Int. Cl.
| | |
|---|---|
| *G07C 5/00* | (2006.01) |
| *F02N 11/00* | (2006.01) |
| *H02M 3/00* | (2006.01) |
| *G07C 5/08* | (2006.01) |
| *F02N 11/08* | (2006.01) |
| *F02N 11/10* | (2006.01) |

(52) U.S. Cl.
CPC ........ *G07C 5/0808* (2013.01); *F02N 11/0862* (2013.01); *F02N 11/108* (2013.01); *F02N 2011/0888* (2013.01); *H02M 3/00* (2013.01)

(58) Field of Classification Search
CPC ......... G07C 5/00; G07C 5/0808; F02N 11/00; F02N 11/0862; F02N 11/108; F02N 2011/0888; H02M 3/00; H02H 7/1213
See application file for complete search history.

(56) References Cited

U.S. PATENT DOCUMENTS

| | | | |
|---|---|---|---|
| 2015/0054337 A1* | 2/2015 | Ogale | B60L 15/007 307/10.1 |
| 2015/0270702 A1* | 9/2015 | Yin | H02H 7/1213 363/21.02 |
| 2016/0006346 A1* | 1/2016 | Satoh | H02M 1/4225 320/109 |

* cited by examiner

*Primary Examiner* — Yonel Beaulieu

(57) ABSTRACT

In an example, a vehicle diagnostic system is disclosed. The vehicle diagnostic system includes a first DC-DC converter having an input and an output and a second DC-DC converter having an input and an output. The output of the first DC-DC converter is connected to the input of the second DC-DC converter at a first node, and the output of the second DC-DC converter is connected to the input of the first DC-DC converter at a second node. The vehicle diagnostic system includes a battery connected to a vehicle load and the first node and a redundant power source connected to the second node. The vehicle diagnostic system includes a control module that is configured to initiate operation of the first DC-DC converter and the second DC-DC converter to cause current re-circulation between the first DC-DC converter and the second DC-DC converter.

16 Claims, 10 Drawing Sheets

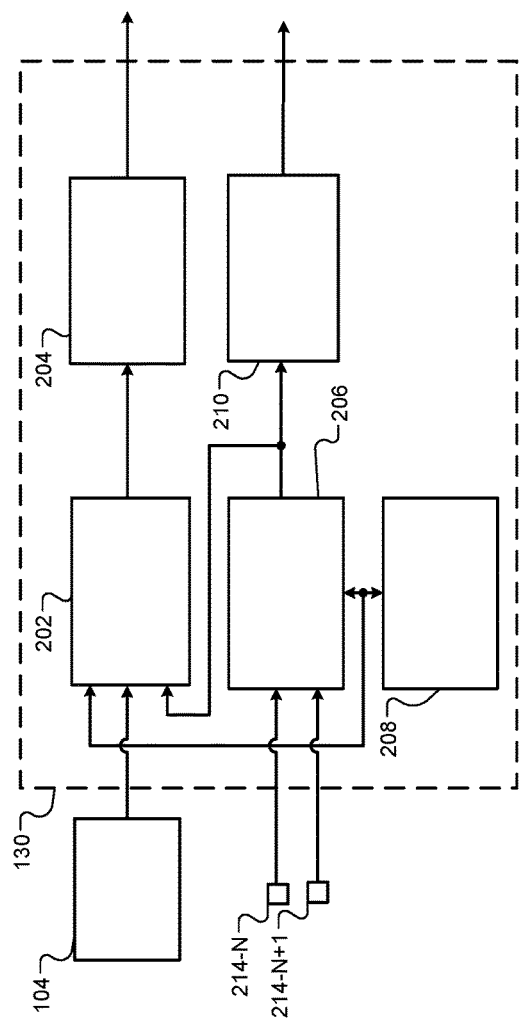
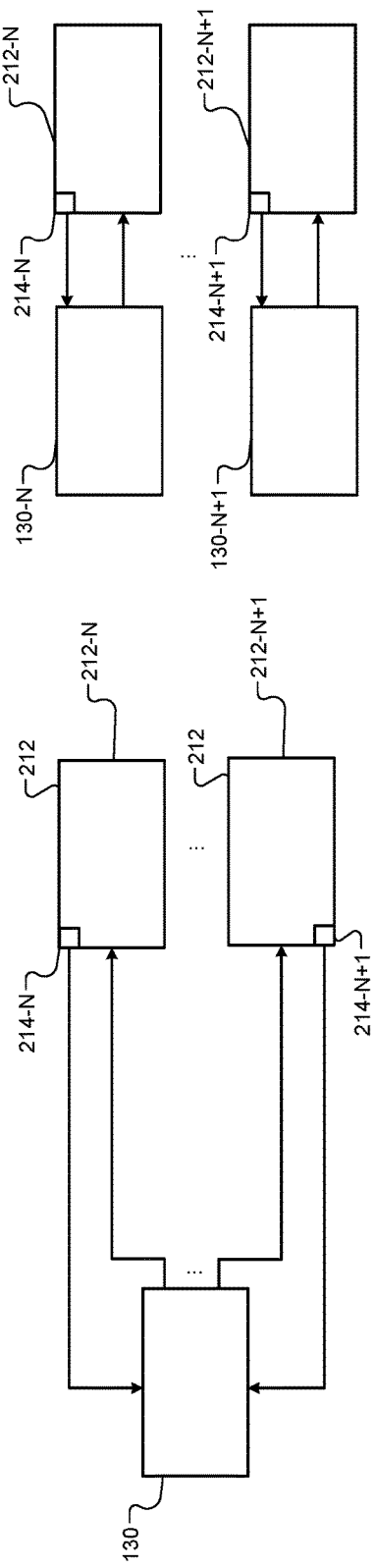
FIG. 2A
FIG. 2B
FIG. 2C

SYSTEM AND METHOD FOR PERFORMING DIAGNOSTICS ON A DC-DC CONVERTER

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure generally relates to systems and methods for monitoring redundant vehicle systems. More particularly, the system and method for performing a diagnostic on DC-DC converters used within redundant vehicle systems.

Vehicles employ redundant electrical systems to mitigate problems in the event one or more electrical systems fail. For instance, safety-critical vehicle systems, such as braking systems and steering systems, can employ one or more redundant electrical systems.

SUMMARY

In an example, a vehicle diagnostic system is disclosed. The vehicle diagnostic system includes a first DC-DC converter having an input and an output and a second DC-DC converter having an input and an output. The output of the first DC-DC converter is connected to the input of the second DC-DC converter at a first node, and the output of the second DC-DC converter is connected to the input of the first DC-DC converter at a second node. The vehicle diagnostic system includes a battery connected to a vehicle load and the first node and a redundant power source connected to the second node. The vehicle diagnostic system includes a control module that is configured to initiate operation of the first DC-DC converter and the second DC-DC converter to cause current re-circulation between the first DC-DC converter and the second DC-DC converter.

In other features, the control module is further configured to determine an operational parameter based upon an amount of current supplied by the battery or the redundant power source to the first node and the second node that adjusts for an efficiency loss. In other features, the control module is further configured to compare the operational parameter to a predetermined threshold and generate a mitigation signal when the operational parameter exceeds the predetermined threshold. In other features, the mitigation signal causes a driver warning device to generate an alert.

In other features, the driver warning device generates a notification, and the notification includes a display, haptic feedback, or a sound. In other features, the mitigation signal controls operation of the vehicle. In other features, the mitigation signal controls a brake actuator module or a steering actuator module. In other features, the determined operational parameter includes a power out characteristic and a power in characteristic corresponding to the first DC-DC converter or the second DC-DC converter.

In other features, the control module is further configured to determine whether a time counter exceeds a predetermined time threshold and initiates operation of the first DC-DC converter and the second DC-DC converter, and the time counter corresponds to a time value since a previous diagnostic event. In other features, the first DC-DC converter includes a first sensor and the second DC-DC converter includes a second sensor.

In an example, a vehicle diagnostic system is disclosed. The vehicle diagnostic system includes a diagnostic module that is configured to determine whether a measured operational parameter corresponding to re-circulated current flow between a first DC-DC converter and a second DC-DC converter exceeds a predetermined operational threshold. The vehicle diagnostic system also includes a mitigation module that is configured to generate a mitigation signal when the measured operational parameter is greater than the predetermined operational threshold.

In other features, the vehicle diagnostic system also includes an activation module that is configured to activate the first DC-DC converter and the second DC-DC converter to cause the re-circulated current flow between the first DC-DC converter and the second DC-DC converter. In other features, the vehicle diagnostic system also includes a timer module that is configured to determine whether a time counter exceeds a predetermined time threshold, and the timer module initiates the activation module when the time counter exceeds the predetermined time threshold.

In other features, the time counter corresponds to a time value since a previous diagnostic event. In other features, the measured operational parameter includes a power out characteristic and a power in characteristic corresponding to the first DC-DC converter or the second DC-DC converter. In other features, the measured operational parameter includes a temperature corresponding to at least one of the first DC-DC converter and the second DC-DC converter. In other features, the mitigation signal causes a driver warning device to generate an alert. In other features, the driver warning device generates a notification that includes a display, haptic feedback, or a sound.

In other features, the mitigation signal controls operation of the vehicle. In other features, the mitigation signal controls a brake actuator module or a steering actuator module.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 2A is a functional block diagram of an example control module according to the principles of the present disclosure;

FIG. 2B is a functional block diagram of an example control module in communication with a plurality of DC-DC converters according to the principles of the present disclosure;

FIG. 2C is a functional block diagram of a plurality of example control modules in communication with respective DC-DC converters according to the principles of the present disclosure;

In the drawings, reference numbers may be reused to identify similar and identical elements.

DETAILED DESCRIPTION

Vehicles will continue to rely on electrical systems as these vehicles continue to take over additional driving tasks. Redundant electrical systems are typically employed to ensure that if the primary electrical system fails, the redundant electrical system can take over.

The present disclosure is directed to a vehicle diagnostic system. The vehicle diagnostic system monitors DC-DC converters used within the redundant electrical systems. For example, the vehicle diagnostic system monitors these DC-DC converters during operation of the vehicle. These systems typically employ two or more DC-DC converters, or phases, that provide power from a redundant power source to a vehicle load or from the primary power source to the redundant power source. During vehicle operation, the DC-DC converters can be activated to allow current to flow between the DC-DC converters. The vehicle diagnostic system monitors one or more operational parameters based upon current flow re-circulation within the DC-DC converters and determines whether the operational parameters exceed predetermined thresholds, which may be indicative that the redundant electrical system requires servicing and/or possible failure.

Figure 1:
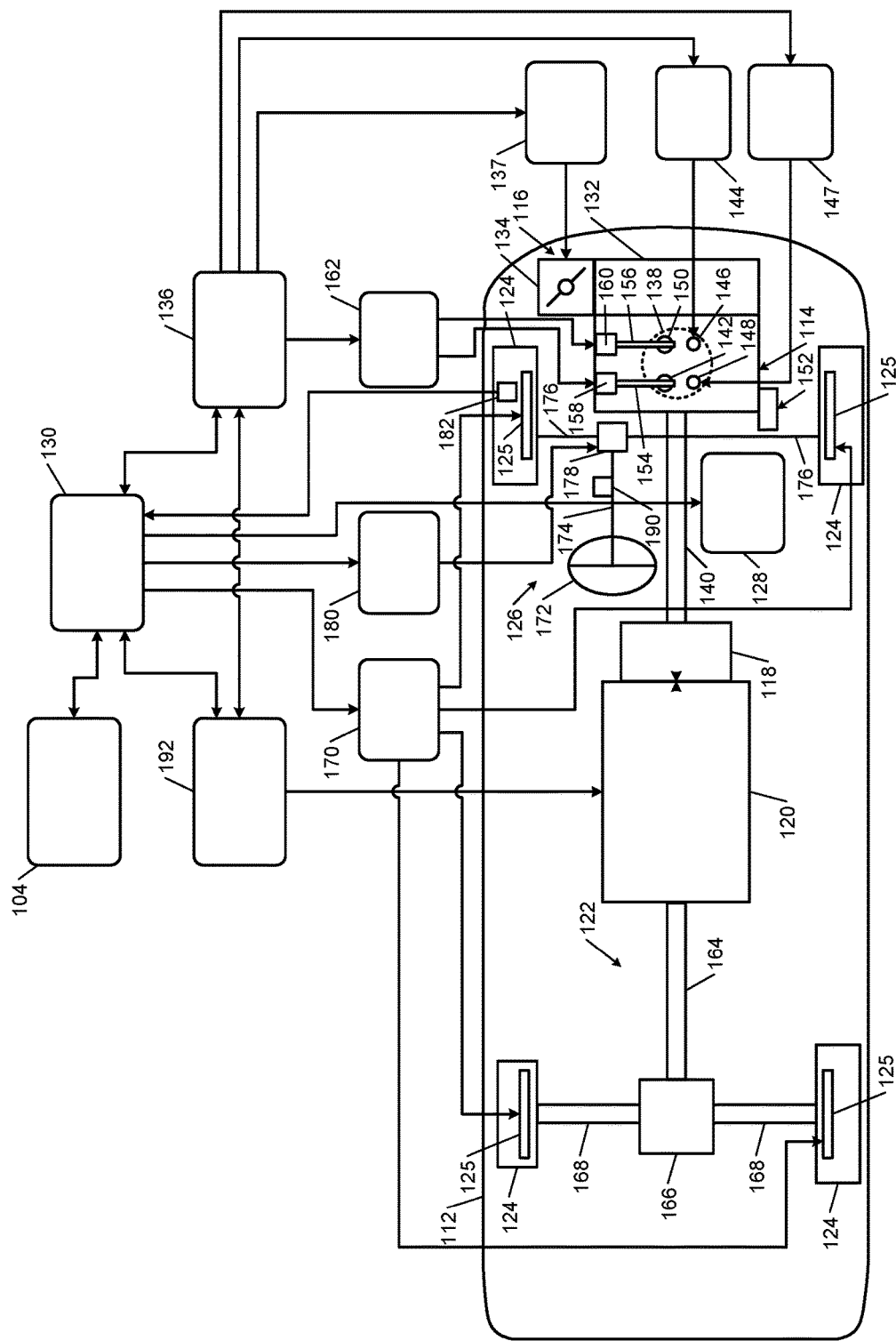
FIG. 1 is a functional block diagram of an example vehicle diagnostic system according to the principles of the present disclosure.

Referring to FIG. 1, a vehicle 110 includes a vehicle body 112, an engine 114, an intake system 116, a torque converter 118, a transmission 120, a driveline 122, wheels 124, friction brakes 125, a steering system 126, and a driver warning device 128. A driver input module 104 receives driver input to initiate operation of the vehicle 110 and/or control operation of the vehicle 110. For example, the driver input module 104 can receive an ignition signal to initiate operation of the vehicle 110. In another example, the driver input module 104 receives torque requests from the driver. The engine 114 combusts an air/fuel mixture to produce drive torque for the vehicle 110.

Air is drawn into the engine 114 through the intake system 116. The intake system 116 includes an intake manifold 132 and a throttle valve 134. The throttle valve 134 may include a butterfly valve having a rotatable blade. An engine control module (ECM) 136 controls a throttle actuator module 137, which regulates opening of the throttle valve 134 to control the amount of air drawn into the intake manifold 132.

Air from the intake manifold 132 is drawn into cylinders of the engine 114. While the engine 114 may include multiple cylinders, for illustration purposes a single representative cylinder 138 is shown. For example only, the engine 114 may include 2, 3, 4, 5, 6, 8, 10, and/or 12 cylinders. The ECM 136 may deactivate some of the cylinders, which may improve fuel economy under certain engine operating conditions.

The engine 114 may operate using a four-stroke cycle. The four strokes, described below, are named the intake stroke, the compression stroke, the combustion stroke, and the exhaust stroke. During each revolution of a crankshaft 140, two of the four strokes occur within the cylinder 138. Therefore, two crankshaft revolutions are necessary for the cylinder 138 to experience all four of the strokes.

During the intake stroke, air from the intake manifold 132 is drawn into the cylinder 138 through an intake valve 142. The ECM 136 controls a fuel actuator module 144, which regulates fuel injections performed by a fuel injector 146 to achieve a target air/fuel ratio. Fuel may be injected into the intake manifold 132 at a central location or at multiple locations, such as near the intake valve 142 of each of the cylinders. In various implementations, fuel may be injected directly into the cylinders or into mixing chambers associated with the cylinders. The fuel actuator module 144 may halt injection of fuel to cylinders that are deactivated.

The injected fuel mixes with air and creates an air/fuel mixture in the cylinder 138. During the compression stroke, a piston (not shown) within the cylinder 138 compresses the air/fuel mixture. The engine 114 may be a compression-ignition engine, in which case compression in the cylinder 138 ignites the air/fuel mixture. Alternatively, the engine 114 may be a spark-ignition engine, in which case a spark actuator module 147 energizes a spark plug 148 to generate a spark in the cylinder 138 based on a signal from the ECM 136, which ignites the air/fuel mixture. The timing of the spark may be specified relative to the time when the piston is at its topmost position, referred to as top dead center (TDC).

The spark actuator module 147 may be controlled by a spark timing signal specifying how far before or after TDC to generate the spark. Because piston position is directly related to crankshaft rotation, operation of the spark actuator module 147 may be synchronized with crankshaft angle. In various implementations, the spark actuator module 147 may halt provision of spark to deactivated cylinders.

Generating the spark may be referred to as a firing event. The spark actuator module 147 may have the ability to vary the timing of the spark for each firing event. The spark actuator module 147 may even be capable of varying the spark timing for a next firing event when the spark timing signal is changed between a last firing event and the next firing event. In various implementations, the engine 114 may include multiple cylinders and the spark actuator module 147 may vary the spark timing relative to TDC by the same amount for all cylinders in the engine 114.

During the combustion stroke, combustion of the air/fuel mixture drives the piston down, thereby driving the crankshaft 140. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 150. The byproducts of combustion are exhausted from the vehicle via an exhaust system 152.

The intake valve 142 may be controlled by an intake camshaft 154, while the exhaust valve 150 may be controlled by an exhaust camshaft 156. In various implementations, multiple intake camshafts (including the intake camshaft 154) may control multiple intake valves (including the intake valve 142) for the cylinder 138 and/or may control the intake valves (including the intake valve 142) of multiple banks of cylinders (including the cylinder 138). Similarly, multiple exhaust camshafts (including the exhaust camshaft 156) may control multiple exhaust valves for the cylinder 138 and/or may control exhaust valves (including the exhaust valve 150) for multiple banks of cylinders (including the cylinder 138).

The time at which the intake valve 142 is opened may be varied with respect to piston TDC by an intake cam phaser 158. The time at which the exhaust valve 150 is opened may be varied with respect to piston TDC by an exhaust cam phaser 160. A valve actuator module 162 may control the intake and exhaust cam phasers 158, 160 based on signals from the ECM 136. When implemented, variable valve lift may also be controlled by the valve actuator module 162.

The valve actuator module 162 may deactivate the cylinder 138 by disabling opening of the intake valve 142 and/or the exhaust valve 150. The valve actuator module 162 may disable opening of the intake valve 142 by decoupling the intake valve 142 from the intake cam phaser 158. Similarly, the valve actuator module 162 may disable opening of the exhaust valve 150 by decoupling the exhaust valve 150 from the exhaust cam phaser 160. In various implementations, the valve actuator module 162 may control the intake valve 142 and/or the exhaust valve 150 using devices other than camshafts, such as electromagnetic or electrohydraulic actuators.

The ECM 136 adjusts the position of the throttle valve 134, the amount and/or timing of fuel injections performed by the fuel injector 146, the timing at which spark is generated by the spark plug 148, and/or the timing at which the intake and exhaust valves 142 and 150 are opened to achieve a target torque output of the engine 114. The ECM 136 determines the target engine torque based on the driver input.

Torque output at the crankshaft 140 is transferred through the torque converter 118, through the transmission 120, through the driveline 122, and to the wheels 124. The driveline 122 includes a drive shaft 164, a differential 166, and axle shafts 168. The torque converter 118, the transmission 120, and the differential 166 amplify engine torque by several gear ratios to provide axle torque at the axle shafts 168. The axle torque rotates the wheels 124, which causes the vehicle 110 to accelerate in a forward or rearward direction.

The friction brakes 125 are mounted to the wheels 124. The friction brakes 125 resist (slow) rotation of the wheels 124 when the friction brakes 125 are applied. The friction brakes 125 may include drum brakes and/or disc brakes, and may include electrohydraulic actuators and/or electromechanical actuators that press a brake pad against a brake disc and/or drum when the friction brakes 125 are applied. A brake actuator module 170 applies the friction brakes 125 based on a brake pedal position and/or a signal from the control module 130. The friction brakes 125 may be independently applied at different levels.

The steering system 126 selectively turns the front wheels 124, thereby turning the vehicle 110. The steering system 126 includes a steering wheel 172, a steering column 174, one or more steering linkages 176, and a steering actuator 178. A driver may rotate the steering wheel 172 to turn the vehicle 110 left or right or to input a request to turn the vehicle 110 left or right. The steering column 174 is coupled to the steering wheel 172 so that the steering column 174 rotates when the steering wheel 172 is rotated. The steering column 174 may also be coupled to the steering linkages 176 so that rotation of the steering column 174 causes translation of the steering linkages 176. The steering linkages 176 are coupled to the front wheels 124 so that translation of the steering linkages 176 turns the wheels 124.

The steering actuator 178 is coupled to the steering linkages 176 and translates the steering linkages 176, thereby turning the front wheels 124. In various implementations, the steering actuator 178 may be an electrohydraulic and/or electromechanical actuator. In implementations where the steering column 174 is coupled to the steering linkages 176, such as power steering systems, the steering actuator 178 may reduce the amount of effort that the driver must exert to turn the vehicle 110 left or right. In various implementations, the steering column 174 may not be coupled to the steering linkages 176, and the steering actuator 178 alone may translate the steering linkages 176. Steering systems where the steering column 174 is not be coupled to the steering linkages 176 may be referred to as a steer-by-wire system.

A steering actuator module 180 adjusts actuation of the steering actuator 178 based on a signal from the control module 130. The control module 130 may control the steering actuator 178 based on the angular position of the steering wheel 172. Alternatively, the control module 130 may control the steering actuator 178 autonomously (e.g., independent of the angular position of the steering wheel 172).

One or more wheel speed sensors 182 are mounted to one or more of the wheels 124 and measures the speed of wheels 124, respectively. For example, one wheel speed sensor may be provided for each wheel and measure that wheels wheel speed.

A steering wheel angle sensor 190 measures the angular position of the steering wheel 172 relative to a predetermined position. The predetermined position may correspond to a location where the vehicle should (or does) travel straight along a longitudinal axis of the vehicle. The steering wheel angle sensor 190 may be mounted to the steering column 174 and may include, for example, a Hall Effect sensor that measures the angular position of a shaft that is disposed within the steering column 174 and rotatably coupled to the steering wheel 172.

A transmission control module (TCM) 192 shifts gears of the transmission 120 based on operating conditions of the vehicle 110 and a predetermined shift schedule. The operating conditions may include the speed of the vehicle 110, a target acceleration of the vehicle 110, and/or a target torque output of the engine 114. The TCM 192 may determine a vehicle speed based on wheel speeds measured using the wheel speed sensors 182. For example, the TCM 192 may determine the vehicle speed based on an average of the wheel speeds or an average of speeds of undriven (i.e., non-driven) wheels of the vehicle. The TCM 192 may receive the target vehicle acceleration and/or the target engine torque from the control module 130 and/or the ECM 136. The ECM 136 may communicate with the TCM 192 to coordinate shifting gears in the transmission 120. For example, the ECM 136 may reduce engine torque during a gear shift.

The control module 130 may activate a driver warning device 128 to notify the driver that one or more redundant vehicle systems may require servicing. The driver warning device 128 may include an electronic display (e.g., a touchscreen display) that is within the view of the driver and is operable to display lights, text, and/or images. Additionally or alternatively, the driver warning device 128 may include a heads-up display (HUD) that, for example, projects light, text, and/or images onto a windshield (not shown) of the vehicle 110. Additionally or alternatively, the driver warning device 128 may include one or more vibrators mounted to, for example, the steering wheel 172 and/or the driver's seat (not shown) to provide haptic feedback to the driver. Additionally or alternatively, the driver warning device 128 may include a speaker that is operable to generate a sound or audible message within the vehicle 110.

FIG. 2A illustrates an example implementation of the control module 130. The control module 130 includes a timer module 202, an activation module 204, a diagnostic module 206, a database 208, and a mitigation module 210. In some embodiments, a single control module 130 is connected to a plurality of DC-DC converters 212-N to 212-N+1, where N is an integer greater than 1, as shown in FIG. 2B. In other embodiments, each DC-DC converter 212-N to 212-N+1 includes a dedicated control module 130-N to 130-N+1 as shown in FIG. 2C.

The control module 130 controls operation of the DC-DC converters 212-N to 212-N+1 as described in greater detail herein. The DC-DC converters 212-N to 212-N+1 include DC-DC converters used within the various redundant vehicle electrical systems of the vehicle 110.

The DC-DC converters 212-N to 212-N+1 include a respective sensor 214-N to 214-N+1. The sensors 214-N to 214-N+1 measure operational parameters of the corresponding DC-DC converter 212-N to 212-N+1. For example, the sensors 214-N to 214-N+1 measure a temperature of the corresponding DC-DC converter 212-N to 212-N+1. In another example, the sensors 214-1 to 214-N measure a voltage and/or current of the DC-DC converter 212-N to 212-N+1. An efficiency of the DC-DC converter 212 can be determined based upon a comparison of power in with respect to power out. For example, a larger than expected efficiency drop or a larger than expected temperature increase may indicate a faulty DC-DC converter 212.

The timer module 202 receives driver input signals from the driver input module 104 to initiate the timer module 202. The timer module 202 maintains a time counter of the last time when a diagnostic event occurred. For example, the timer module 202 increments a time counter during vehicle operation until the time counter exceeds a predetermined time threshold. For example, the predetermined time threshold corresponds to a time threshold defined according to an ISO 26262 standard related to the specific vehicle system. In one example, the time threshold for the braking system may be a time value, and the time threshold for the steering system may be another time value. In another example, the time threshold may represent a time as provided by an Automotive Safety Integrity (ASIL) rating corresponding to the subsystem within the vehicle 110. In yet another example, the time threshold may represent a time corresponding to failure rates of components used within the control module 130 and/or the DC-DC converter 212.

The timer module 202 is in communication with the database 208. The database 208 includes data indicative of when the last diagnostic event occurred for a particular vehicle system, data indicative of when the next diagnostic event should occur, and so forth. The database 208 can also include the time thresholds for the particular vehicle systems and current counters initiated by the timer module 202. Upon receiving the driver input signal, the current counters for the vehicle systems are provided to the timer module 202 by the database. The timer module 202 compares the current counter for the vehicle systems with the corresponding time thresholds for the particular vehicle system.

Once the current counter exceeds the corresponding predetermined time threshold, the timer module 202 provides a timer signal to the activation module 204. Upon receiving the timer signal, the activation module 204 provides an activation signal to the DC-DC converter 212 corresponding to the vehicle system of interest. The initialization signal initializes diagnostic operation of the corresponding DC-DC converter 212 as discussed below. The timer module 202 also maintains an activation counter indicative of the time period of the diagnostic operation. The timer module 202 increments the activation counter until a deactivation threshold is exceeded. For example, once the activation counter exceeds the deactivation threshold, the timer module 202 provides another timer signal to the activation module 204. Upon receiving this timer signal, the activation module 204 provides a deactivation signal to deactivate the diagnostic operation.

Generally referring to FIGS. 3 to 8, an example vehicle diagnostic system 300 is disclosed. The vehicle diagnostic system 300 includes a first DC-DC converter 212-1 and a second DC-DC converter 212-2 that are connected to the control module 130. It is understood that the first DC-DC converter 212-1 can correspond to the DC-DC converter 212-N and the second DC-DC converter 212-2 can correspond to the DC-DC converter 212-N+1 described above, or vice versa. The first DC-DC converter 212-1 includes an input 302 and an output 304. The second DC-DC converter 212-2 includes an input 306 and an output 308. The input 302 of the first DC-DC converter 212-1 is connected to the output 308 of the second DC-DC converter 212-2 at a first node 310. The input 306 of the second DC-DC converter 212-2 is connected to the output 304 of the first DC-DC converter 212-1 at a second node 312.

Figure 3:
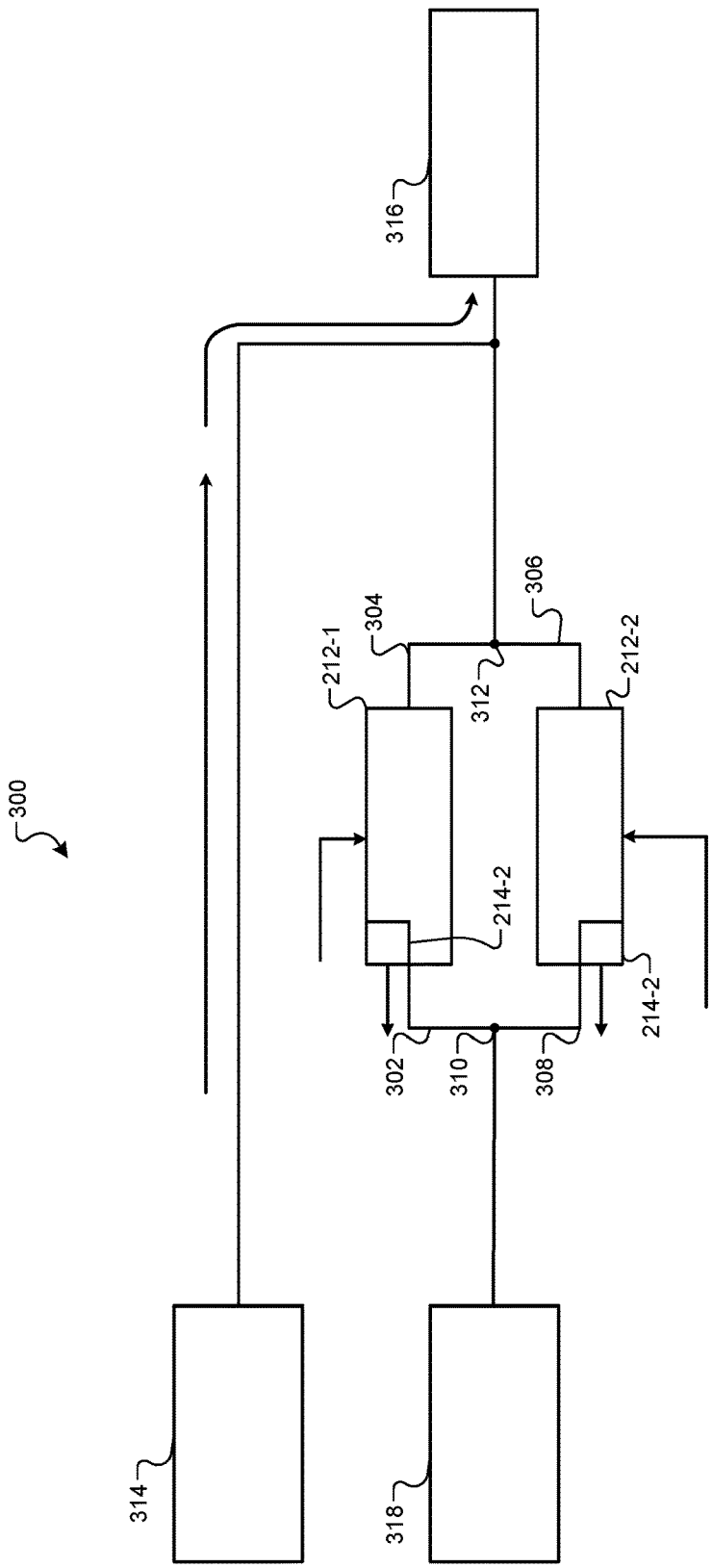
FIGS. 3 through 8 are functional block diagrams illustrating operation of a DC-DC converter according to the principles of the present disclosure.

Upon activation of the vehicle 110, a primary power source 314 provides power to a vehicle load 316 as shown in FIG. 3. The vehicle load 316 includes vehicle generators used within the vehicle system of interest. For example, the vehicle load 316 can be a vehicle generator associated with the braking system, the steering system, or the engine system. In various implementations, the primary power source 314 includes the battery of the vehicle 110.

Figure 4:
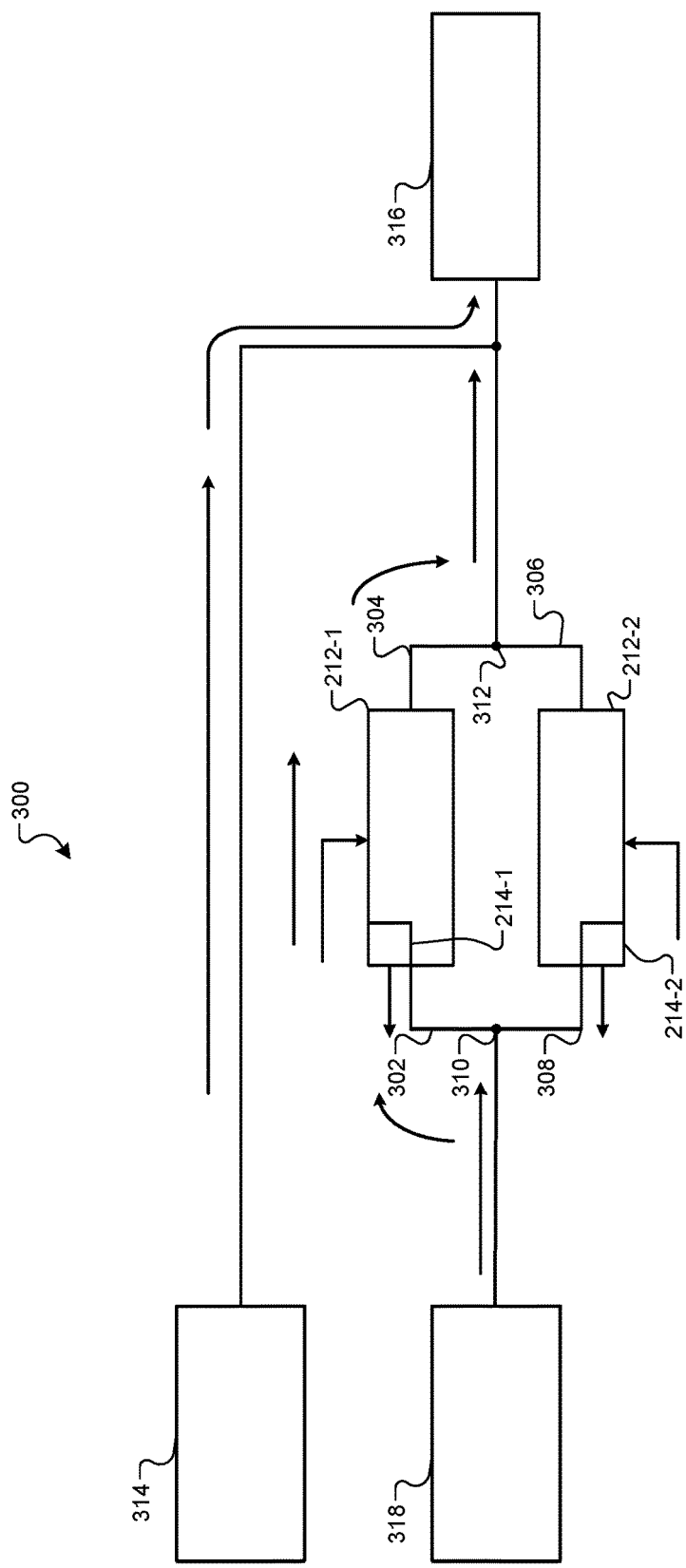
Figure 5:
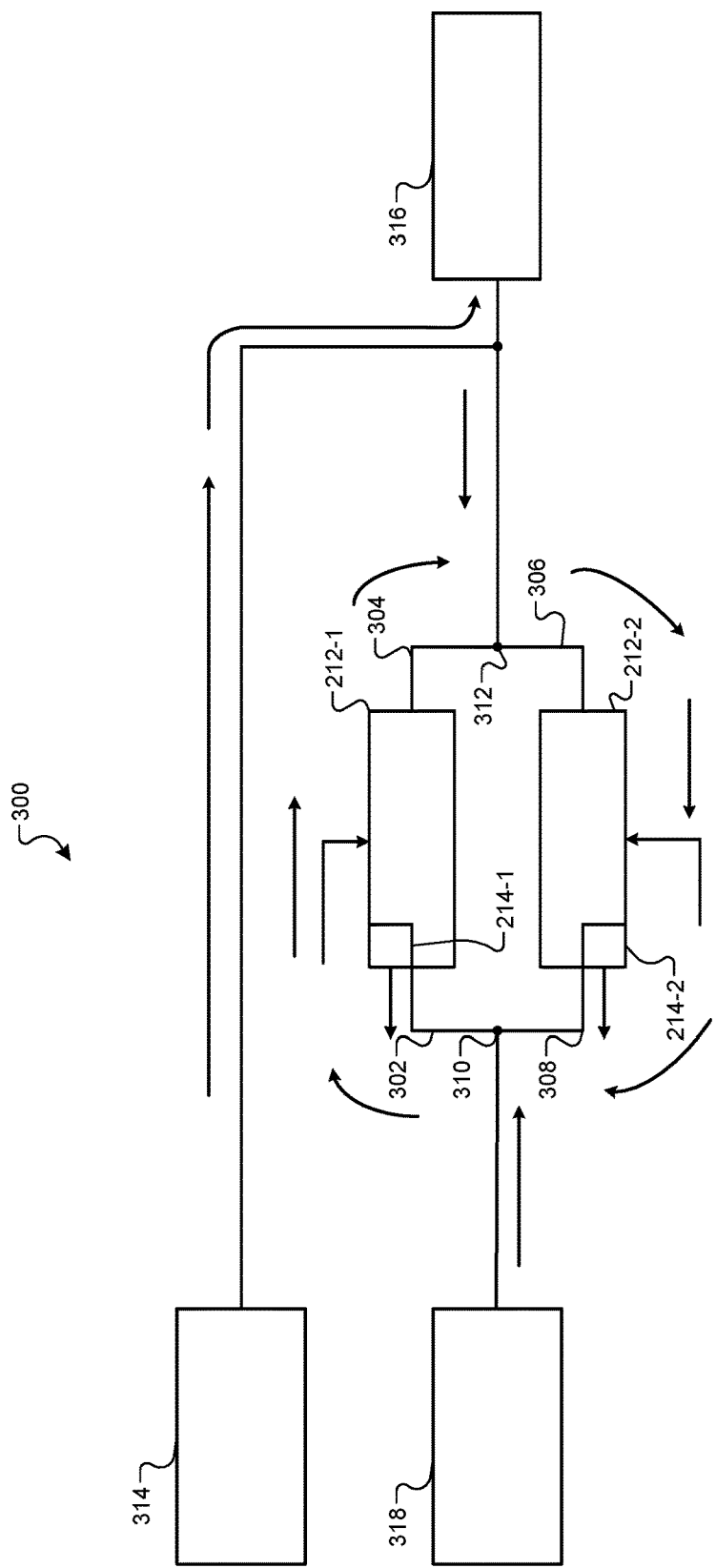

As shown in FIG. 4, a first DC-DC converter 212-1 is activated, in response to the activation signal, to provide current to the vehicle load 316 from a redundant power source 318 via the first DC-DC converter 212-1. As shown in FIG. 5, once the first DC-DC converter 212-1 has been activated, a second DC-DC converter 212-2 is activated allowing for current re-circulation between the first DC-DC converter 212-1 and the second DC-DC converter 212-2 (except for energy loss due to inefficiencies, such as internal resistance, or the like). For example, current at the output 304 of the first DC-DC converter 212-1 is provided to the input 306 of the second DC-DC converter 212-2. Additionally, current at the output 308 of the second DC-DC converter 212-2 is provided to the input 302 of the first DC-DC converter 212-1.

Figure 6:
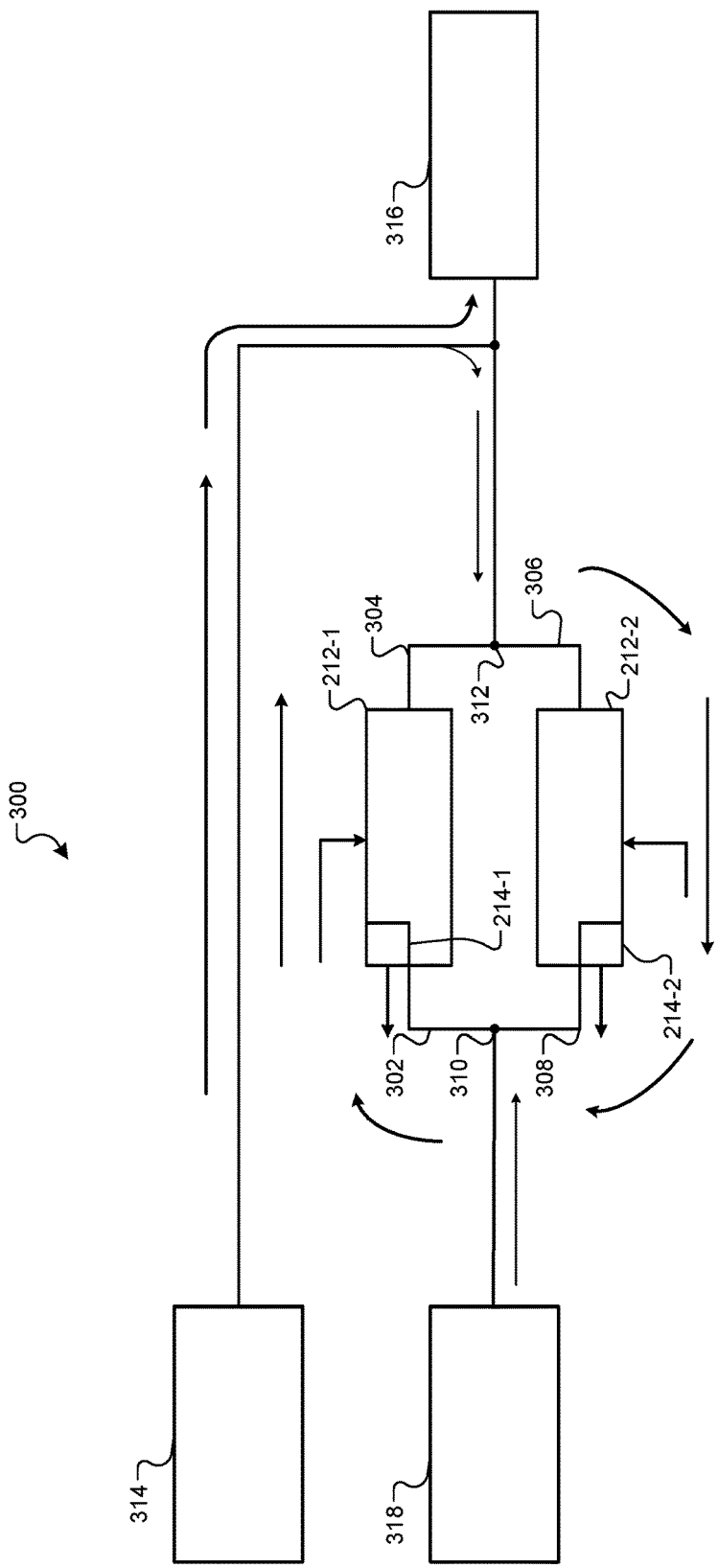

As shown in FIG. 6, after the initial inrush of current into the first DC-DC converter 212-1 due to activation of the second DC-DC converter 212-2, current supplied from the primary power source 314 and the redundant power source 318 to the DC-DC converters 212-1, 212-2 provide an adjusted current level that makes up for efficiency losses within the DC-DC converter 212. The sensors 214-1, 214-2 measure operational parameters of the respective DC-DC converters 212-1, 212-2 based upon the adjusted current level provided by the power sources 314, 318 and provide a sensor signal indicative of the operational parameter to the diagnostic module 206. For example, the measured operational parameter may be the adjusted current level provided to make up for the efficiency losses within the DC-DC converters 212-1, 212-2. In another example, the measured operational parameter may be a measured temperature of the DC-DC converters 212-1, 212-2. In yet another example, the measured operational parameters may be a power out and/or power in for the DC-DC converters 212-1, 212-2. In various embodiments, the activation signal can also cause the DC-DC converters 212-1, 212-2 to reverse polarity to allow current to flow in the opposite direction. This embodiment allows the control module 130 to determine the operational parameters of the DC-DC converters 212-1, 212-2 operating in the reverse polarity.

Figure 7:
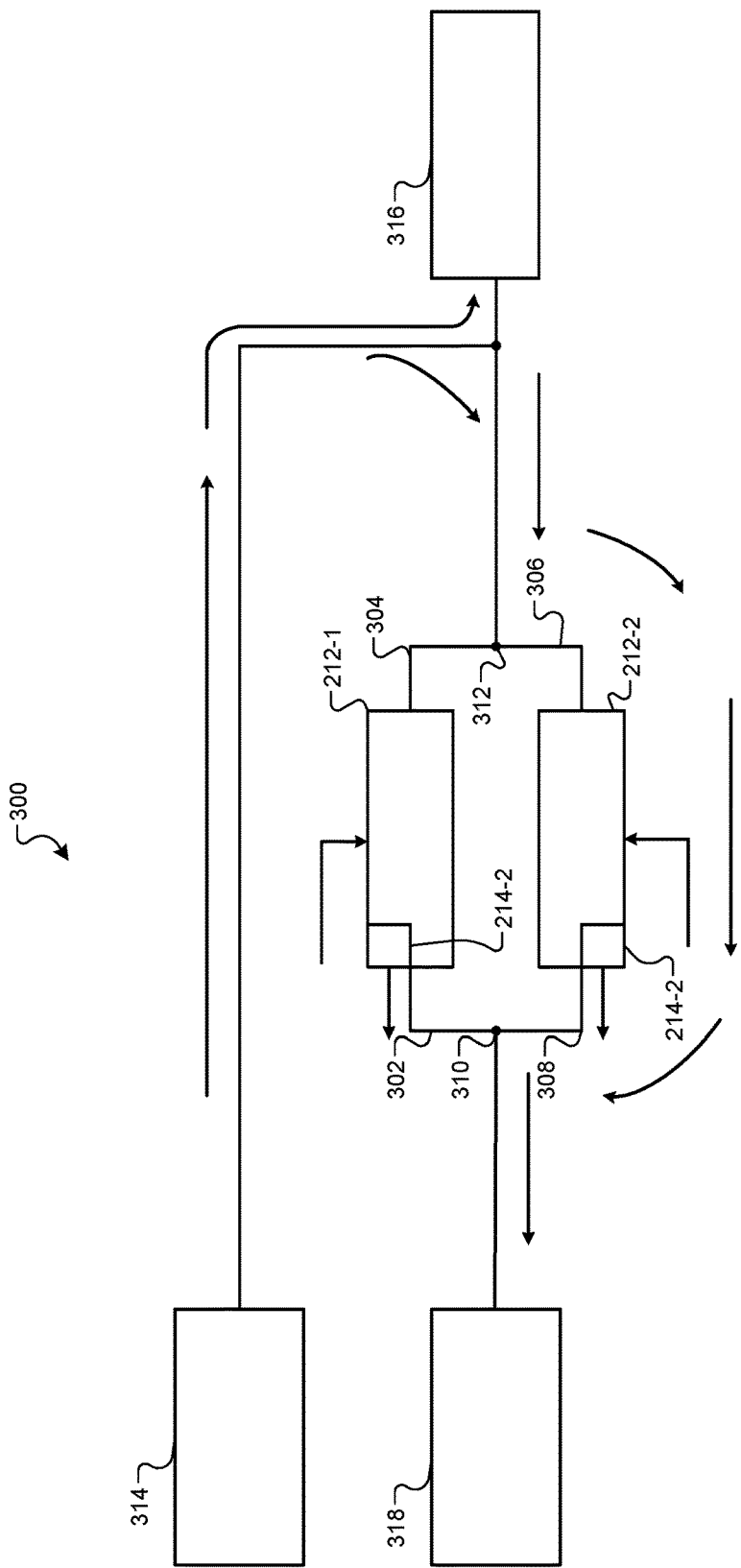
Figure 8:
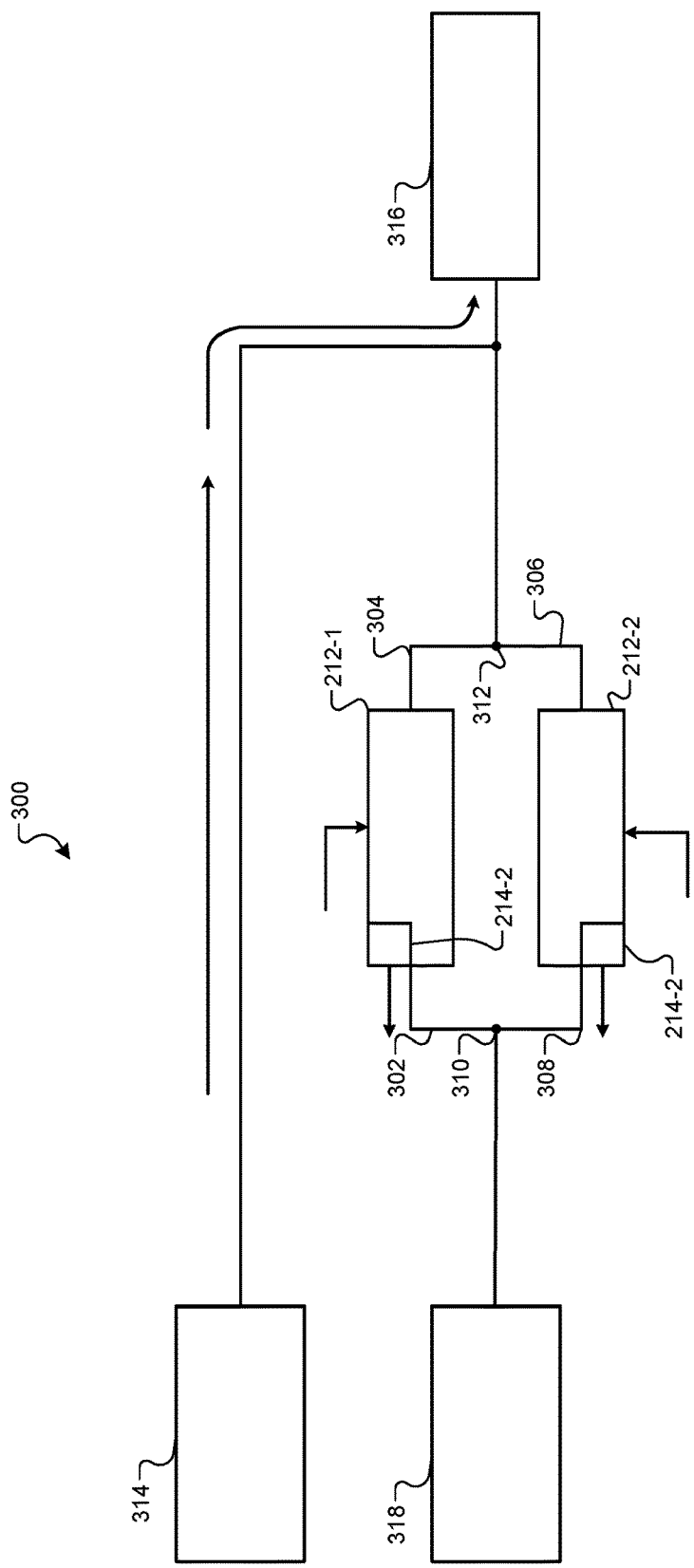

Referring to FIG. 7, the deactivation signal is received by the first DC/DC converter 212-1. Once the first DC/DC converter 212-1 is deactivated, current flows through the second DC/DC converter 212-2 to recharge the redundant power source 318. As shown in FIG. 8, the second DC-DC converter 212-2 is deactivated via another deactivation signal provided by the control module 130. While FIGS. 3 through 8 illustrate two DC-DC converters 212-1, 212-2 (i.e., two phases), it is understood that the present disclosure can be applied to other DC-DC converter 212 configurations that have three or more DC-DC converters 212 (i.e., three phases).

The diagnostic module 206 receives the sensor signal as input. The sensor signal is indicative of a measured operational parameter of the DC-DC converter 212. The diagnostic module 206 can calculate an efficiency of the DC-DC converter 212 based upon the sensor signal(s). The diagnostic module 206 compares the operational parameter a predetermined operational threshold. The predetermined operational threshold includes a desired operational parameter of the DC/DC converter 212 stored in the database 208. For example, the desired operational parameter is a minimum DC/DC converter efficiency parameter. The efficiency parameter corresponds to the amount of power and/or current supplied by the power source 302 and/or the redundant power source 310 to the DC/DC converter 212 to maintain the internal bi-directional current flow. An increased supply of power and/or current is indicative of a relatively less DC-DC converter 212. In another example, the desired operational parameter is a desired maximum operating temperature of the DC/DC converter. The operating temperature may also correspond to the amount of power and/or current supplied by the power source 302 and/or the redundant power source 310 to the DC/DC converter 212 to maintain the internal bi-directional current flow.

The predetermined operational threshold for the respective vehicle systems is stored in the database 208 and can be accessed by the diagnostic module 206. The diagnostic module 206 generates a diagnostic signal indicative of whether the sensor signal exceeds the predetermined operational threshold. The diagnostic signal is provided to the timer module 202 and the mitigation module 210. Upon receiving the diagnostic signal, the timer module 202 resets the corresponding time counter indicating the respective vehicle system diagnostic event has completed.

In some examples, the diagnostic module 206 compares the sensor signal to a predetermined vehicle system failure threshold when the sensor signal exceeds the predetermined operational threshold. When the diagnostic module 206 determines the sensor signal exceeds the predetermined vehicle system failure threshold, the diagnostic module 206 generates an imminent failure diagnostic signal.

The mitigation module 210 generates a mitigation signal when the diagnostic signal indicates the operational parameter exceeds the predetermined operational threshold. For example, the diagnostic signal is generated when the operational parameter indicates the DC/DC converter 212 efficiency is below the minimum DC/DC converter efficiency parameter. In another example, the diagnostic signal is generated when the operational parameter indicates the DC/DC converter 212 temperature is above the maximum operating temperature.

The mitigation signal causes the driver warning device 128 to generate an alert indicating that a redundant vehicle system requires servicing. For example, the alert may be conveyed as a visual alert, an audible alert, a haptic alert, or the like to indicate possible redundant system failure via the driver warning device 128.

The mitigation module 208 can also generate a mitigation signal that controls operation of the vehicle 110 upon receiving the imminent failure diagnostic signal. In one example, the mitigation module 208 generates a mitigation signal that causes the brake actuator module 170 to engage the braking components of the vehicle 110. In another example, the mitigation module 208 generates a mitigation signal that causes the steering actuator module 180 to engage the steering components of the vehicle 110 to cause the vehicle to alter trajectory. It is understood that other mitigation techniques may be employed.

Figure 9:
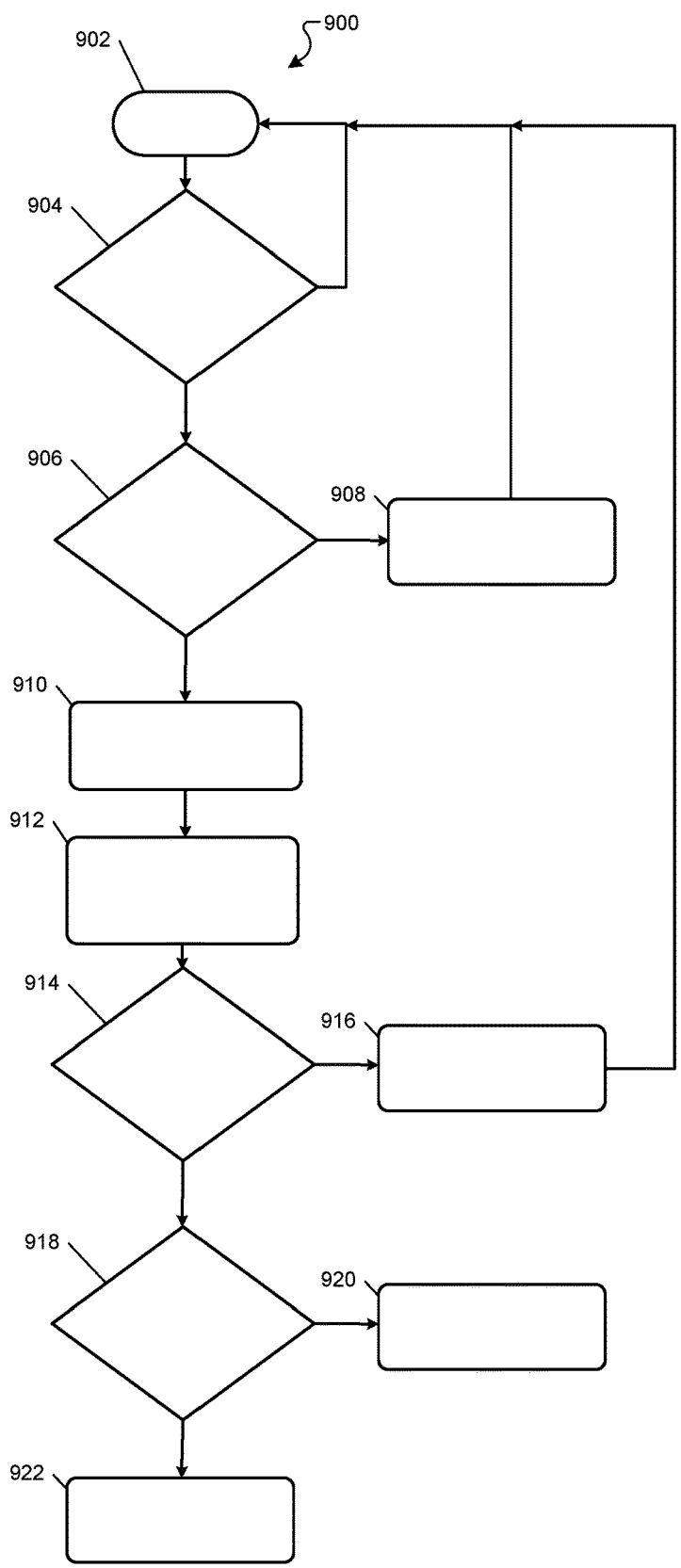
FIG. 9 is a flowchart illustrating an example method for performing a diagnostic on a DC-DC converter according to the principles of the present disclosure.

FIG. 9 illustrates an example method 900 for performing a diagnostic on a DC-DC converter 212. The method 900 is described in the context of the modules included in the example implementation of the control module 130 shown in FIG. 2A. However, the particular modules that perform the steps of the method may be different than those mentioned below and/or the method may be implemented apart from the modules of FIG. 2A.

The method 900 begins at 902. At 904, control determines whether driver input has been received. The driver input is indicative that the vehicle 110 is currently operating. If no driver input has been received, control returns to 902. If driver input has been received, the timer module 202 is initiated at 904. The timer module 202 determines whether the time counter exceeds the predetermined time threshold at 906. If the time counter does not exceed the predetermined time threshold, the timer module 202 increments the time counter at 908 and returns to 902.

If the time counter does exceed the predetermined time threshold, the activation signal is provided to the DC-DC converter 212 by the activation module 204 at 910. The diagnostic module 206 receives the sensor signal from the sensor 214 at 912. The diagnostic module 206 determines whether the operational parameter exceeds the predetermined operational threshold of the DC/DC converter 212 at 914. If the operational parameter does not exceed the predetermined operational threshold, control resets the time counter at 916 and returns to 902. If the operational parameter exceeds the predetermined operational threshold, the diagnostic module 206 determines whether the sensor signal exceeds the predetermined vehicle system failure threshold at 918.

If the operational parameter does not exceed the predetermined vehicle system failure threshold, the mitigation module 210 causes the driver warning device 128 to generate an alert at 920. If the operational parameter does exceed the predetermined vehicle system failure threshold, the mitigation module 210 generates a mitigation signal to control operation of the vehicle 110 at 922.

Figure 10:
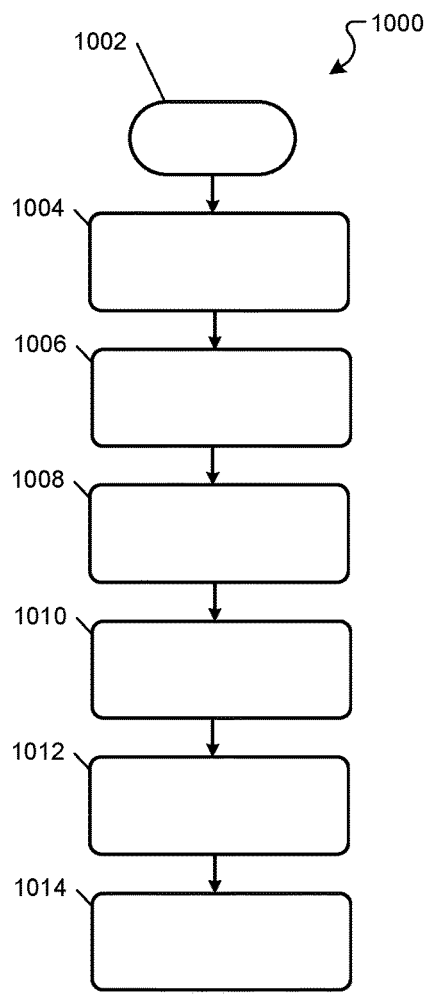
FIG. 10 is a flowchart illustrating an example method for operating the vehicle diagnostic system according to the principles of the present disclosure.

FIG. 10 illustrates an example method 1000 for controlling operation of multiple DC-DC converters 212 in accordance with an example implementation of the present disclosure. The method begins at 1002. At 1004, the primary power source 314 provides power to the vehicle load 316. At 1006, the activation signal is provided to the first DC-DC converter 212-1 allowing current to flow from the redundant power source 318 to the vehicle load 316 via the first DC-DC converter 212-1. At 1008, the activation signal is provided to the second DC-DC converter 212-2 to allow for current re-circulation between the first DC-DC converter 212-1 and the second DC-DC converter 212-2.

At 1010, operational parameters of the corresponding DC-DC converters 212-1, 212-2 are measured by respective sensors 214-1, 214-2. It is understood that the polarity of the DC-DC converters 212-1, 212-2 can be reversed as described above to measure the operational parameters while the DC-DC converters 212-1, 212-2 are operating in the reversed polarity state. At 1012, the first DC-DC converter 212-1 is deactivated to re-charge the redundant power source 318. At 1014, the second DC-DC converter 212-2 is de-activated.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the implementations is described above as having certain features, any one or more of those features described with respect to any implementation of the disclosure can be implemented in and combined with features of any of the other implementations, even if that combination is not explicitly described. In other words, the described implementations are not mutually exclusive, and permutations of one or more implementations with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and microcode, and may refer to programs, routines, functions, classes, data structures, and objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A vehicle diagnostic system comprising:
a first DC-DC converter having an input and an output;
a second DC-DC converter having an input and an output, wherein the output of the first DC-DC converter is connected to the input of the second DC-DC converter at a first node and the output of the second DC-DC converter is connected to the input of the first DC-DC converter at a second node;
a battery connected to a vehicle load and the first node;
a redundant power source connected to the second node; and
a control module that is configured to initiate operation of the first DC-DC converter and the second DC-DC converter to cause current re-circulation between the first DC-DC converter and the second DC-DC converter and determine an operational parameter based upon an amount of current supplied by at least one of the battery and the redundant power source to the first node and the second node that adjusts for an efficiency loss.

2. The vehicle diagnostic system as recited in claim 1, wherein the control module is further configured to:
compare the operational parameter to a predetermined threshold; and
generate a mitigation signal when the operational parameter exceeds the predetermined threshold.

3. The vehicle diagnostic system as recited in claim 2, wherein the mitigation signal causes a driver warning device to generate an alert.

4. The vehicle diagnostic system as recited in claim 3, wherein the driver warning device generates a notification comprising at least one of a display, haptic feedback, or a sound.

5. The vehicle diagnostic system recited in claim 3, wherein the mitigation signal controls operation of a vehicle.

6. The vehicle diagnostic system recited in claim 5, wherein the mitigation signal controls at least one of a brake actuator module and a steering actuator module.

7. The vehicle diagnostic system as recited in claim 1, wherein the determined operational parameter includes a power out characteristic and a power in characteristic corresponding to at least one of the first DC-DC converter and the second DC-DC converter.

8. The vehicle diagnostic system as recited in claim 1, wherein the control module is further configured to determine whether a time counter exceeds a predetermined time threshold and initiates operation of the first DC-DC converter and the second DC-DC converter, wherein the time counter corresponds to a time value since a previous diagnostic event.

9. The vehicle diagnostic system as recited in claim 1, wherein the first DC-DC converter includes a first sensor and the second DC-DC converter includes a second sensor.

10. A vehicle diagnostic system comprising:
a diagnostic module that is configured to determine whether a measured operational parameter corresponding to re-circulated current flow between a first DC-DC converter and a second DC-DC converter exceeds a predetermined operational threshold;
a mitigation module that is configured to generate a mitigation signal when the measured operational parameter is greater than the predetermined operational threshold;
an activation module that is configured to activate the first DC-DC converter and the second DC-DC converter to cause the re-circulated current flow between the first DC-DC converter and the second DC-DC converter; and
a timer module that is configured to determine whether a time counter exceeds a predetermined time threshold, wherein the timer module is configured to initiate the activation module when the time counter exceeds the predetermined time threshold, and wherein the time counter corresponds to a time value since a previous diagnostic event.

11. The vehicle diagnostic system as recited in claim 10, wherein the measured operational parameter includes a power out characteristic and a power in characteristic corresponding to at least one of the first DC-DC converter and the second DC-DC converter.

12. The vehicle diagnostic system as recited in claim 10, wherein the measured operational parameter includes a temperature corresponding to at least one of the first DC-DC converter and the second DC-DC converter.

13. The vehicle diagnostic system as recited in claim 10, wherein the mitigation signal causes a driver warning device to generate an alert.

14. The vehicle diagnostic system as recited in claim 13, wherein the driver warning device generates a notification comprising at least one of a display, haptic feedback, or a sound.

15. The vehicle diagnostic system recited in claim 10, wherein the mitigation signal controls operation of the vehicle.

16. The vehicle diagnostic system recited in claim 15, wherein the mitigation signal controls at least one of a brake actuator module and a steering actuator module.

* * * * *